(12) United States Patent
Mastrototaro et al.

(10) Patent No.: US 10,873,234 B2
(45) Date of Patent: Dec. 22, 2020

(54) CLOSURE SYSTEM FOR ELECTRIC MOTOR AND CORRESPONDING CLOSING PROCEDURE

(71) Applicant: Johnson Electric International AG, Murten (CH)

(72) Inventors: Marco Mastrototaro, Turin (IT); Valerio Baravalle, Asti (IT); Luca Gallace, Asti (IT)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 57 days.

(21) Appl. No.: 16/277,207

(22) Filed: Feb. 15, 2019

(65) Prior Publication Data

US 2019/0260258 A1 Aug. 22, 2019

(30) Foreign Application Priority Data

Feb. 16, 2018 (IT) .................. 102018000002750

(51) Int. Cl.
| | |
|---|---|
| *H02K 5/10* | (2006.01) |
| *H02K 15/14* | (2006.01) |
| *F16C 33/72* | (2006.01) |
| *F16C 33/76* | (2006.01) |
| *H02K 5/173* | (2006.01) |
| *F16C 19/54* | (2006.01) |

(52) U.S. Cl.
CPC ............. *H02K 5/10* (2013.01); *F16C 33/723* (2013.01); *H02K 15/14* (2013.01); *F16C 19/54* (2013.01); *F16C 33/768* (2013.01); *F16C 2226/76* (2013.01); *F16C 2380/26* (2013.01); *H02K 5/1735* (2013.01)

(58) Field of Classification Search
CPC ........ H02K 5/10; H02K 15/14; H02K 5/1735; F16C 33/723; F16C 2380/26; F16C 33/768; F16C 19/54; F16C 2226/76; F16C 33/7816; F16C 33/7886; F16C 19/06
USPC ...................................... 310/88, 89
See application file for complete search history.

(56) References Cited

U.S. PATENT DOCUMENTS

| | | | | |
|---|---|---|---|---|
| 6,851,508 | B2 * | 2/2005 | Fukuda | B62D 5/0427 180/443 |
| 2004/0154857 | A1 * | 8/2004 | Fukuda | B62D 5/0466 180/444 |
| 2014/0252898 | A1 * | 9/2014 | Sauer | H02J 7/007 310/88 |
| 2015/0239334 | A1 * | 8/2015 | El Baraka | H02K 3/522 310/78 |
| 2019/0260258 | A1 * | 8/2019 | Mastrototaro | F16C 33/7816 |

* cited by examiner

*Primary Examiner* — John K Kim
(74) *Attorney, Agent, or Firm* — Millman IP Inc.

(57) ABSTRACT

A closure system for a seat of an electric motor adapted for housing a rotor of the electric motor, which is allowed to provide a perfect and resistant sealing of the seat, without the need to apply a resin near the lid. when the lid is at least partially inserted into the seat of the rotor, an annular gasket is disposed in contact between the lid and the seat, one end of the main body of a retaining element, which faces the opening, elastically presses against the central portion of the lid, and an opposite radially protruding end of the tabs of the retaining element, elastically presses against the seat, to prevent the removal of the lid from the seat.

19 Claims, 4 Drawing Sheets

CLOSURE SYSTEM FOR ELECTRIC MOTOR AND CORRESPONDING CLOSING PROCEDURE

CROSS REFERENCE TO RELATED APPLICATIONS

This non-provisional patent application claims priority under 35 U.S.C. § 119(a) from Patent Application No. 102018000002750 filed in Italy on 16 Feb. 2018, the entire contents of which are hereby incorporated by reference.

FIELD

The present disclosure is, in general, in the field of closure systems and closing methods for electric motors; in particular, the disclosure relates to a closure system for a seat of an electric motor suitable for housing a rotor of the electric motor, and to a corresponding closing method.

BACKGROUND

Generally, a motor includes a cylindrical casing for accommodating components such as a stator and a rotor, the casing having an open end and a closed end. In known closure systems, a seat of an electric motor adapted to house a rotor needs to be sealed to prevent access of dirt or water into the seat. The presence of any dirt or water inside the seat would compromise the rotation of the rotor in the seat, in some cases until the rotor is totally blocked.

To achieve the sealing, a lid is usually placed in an opening of the rotor seat. This lid is kept stably in position in the seat by injection of a resin, which once solidified avoids the removal of the lid from the seat and guarantees the required sealing. Disadvantageously, following the laying of the resin, the motor is subjected to a thermal cure cycle, with the aim of bringing the resin to complete hardening, resulting in a noticeable lowering of the viscosity of the resin itself. Because of this, the resin can slip into the seat and compromise rotor rotation. For example, inside the seat, at least one bearing 15 may be arranged which may no longer function properly if it is invaded by the resin. Furthermore, due to the leak, the level of the resin may be low, and the sealing of the seat may no longer be guaranteed.

SUMMARY OF THE INVENTION

An object of the present disclosure is therefore that of providing a closure system for a seat of an electric motor adapted to house a rotor of the electric motor, and a corresponding closing method which is allowed to provide a perfect and resistant sealing of the seat, without the need to apply a resin around the lid. Moreover, by removing the need to use a resin, the processing times required for closing the seat are reduced.

To obtain this result a closure system is provided for a seat of an electric motor designed to house a motor rotor.

The closure system includes a lid which is arranged to be at least partially inserted into the seat and which comprises a central portion, a plurality of fins radially protruding from the central portion. The fins include an abutment surface adapted to limit the insertion of the lid in the seat and are arranged in such a way as to form free area between them.

The closure system further comprises an annular gasket arranged in a housing defined in the lid to isolate the seat, and a retaining element.

This retaining element comprises a main body which includes an opening which at least partially accommodates the central portion of the lid, and a plurality of fins radially protruding from the main body of the retaining element.

The plurality of tabs of the retaining element is each arranged in one of the free areas.

When the lid is at least partially inserted in the seat, the annular gasket is arranged in contact between the lid and the seat, a first end of the main body of the retaining element, which faces the opening, presses elastically against the central portion of the lid, and a second, radially protruding end of the tabs of the retaining element presses elastically against the seat, to prevent removal of the lid from the seat.

The aforesaid and other objects and advantages are achieved, according to an aspect of the disclosure, by a closure system for a seat of an electric motor adapted to house a rotor of the electric motor, and to a corresponding closing method having the characteristics defined in the respective independent claims. Preferred embodiments of the disclosure are defined in the dependent claims, the content of which is to be understood as an integral part of the present description.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiment.

DETAILED DESCRIPTION OF THE PREFERRED EMBODIMENTS

Figure 1:
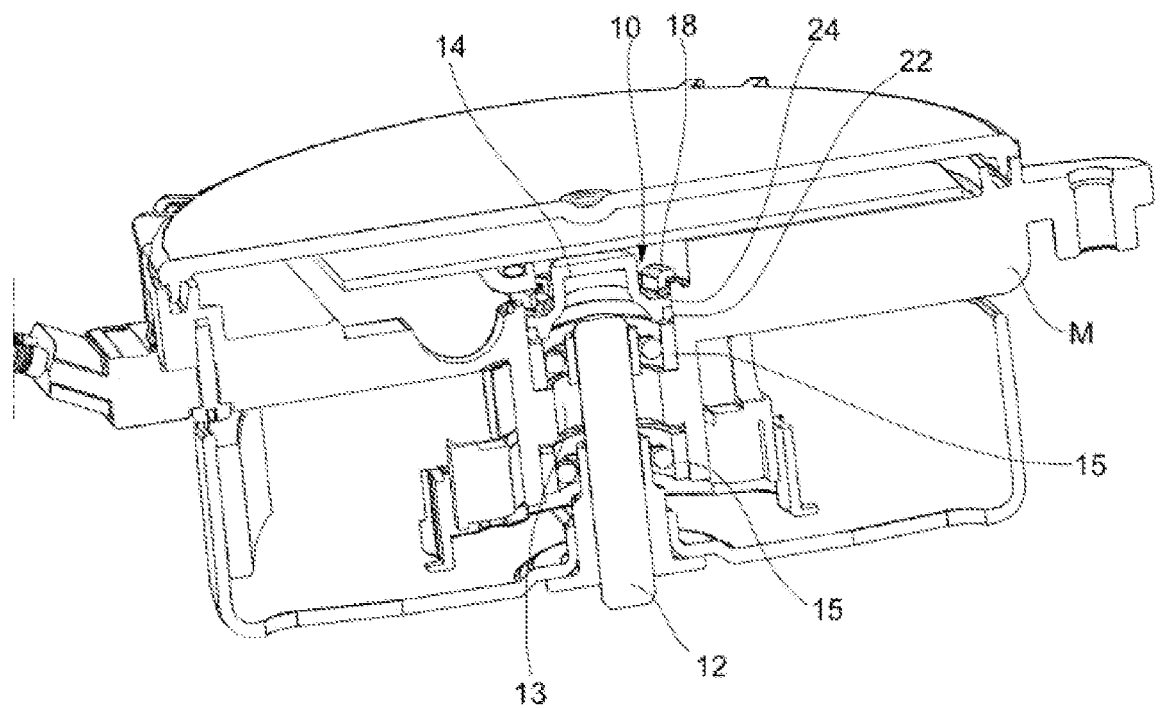
FIG. 1 is a cross-sectional view of an electric motor in which a closure system in accordance with an exemplary embodiment of the present disclosure.

Before explaining in detail a plurality of embodiments of the disclosure, it should be clarified that the disclosure is not limited in its application to the constructional details and to the configuration of the components presented in the following description or illustrated in the drawings. The disclosure is able to take on other embodiments and be implemented or practically performed in different ways. It must also be understood that phraseology and terminology are for descriptive purposes and should not be construed as limiting. The use of "include" and "comprise" and their variations are to be understood as comprising the elements enunciated thereafter and their equivalents, as well as additional elements and their equivalents.

Figure 2:
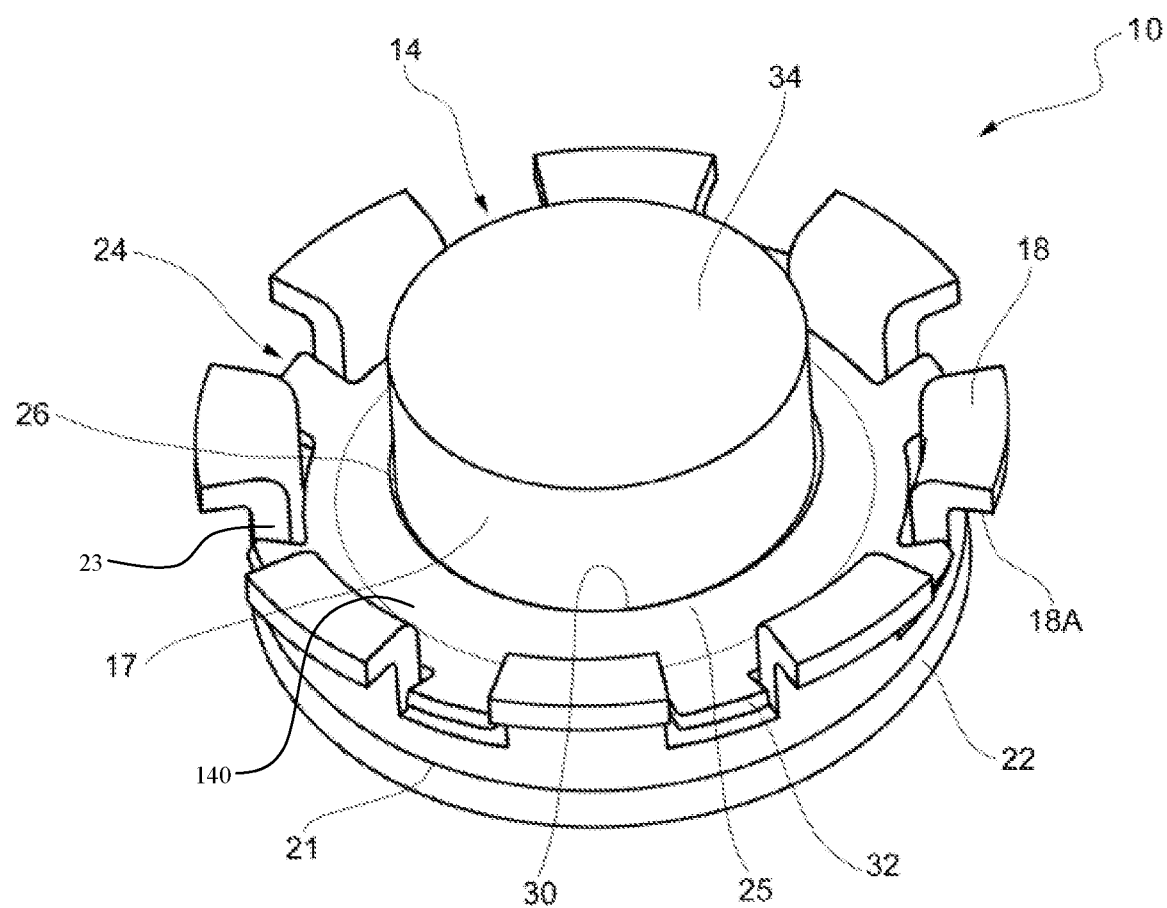
FIG. 2 is an isometric view of the closure system of the electric motor in FIG. 1.
Figure 3:
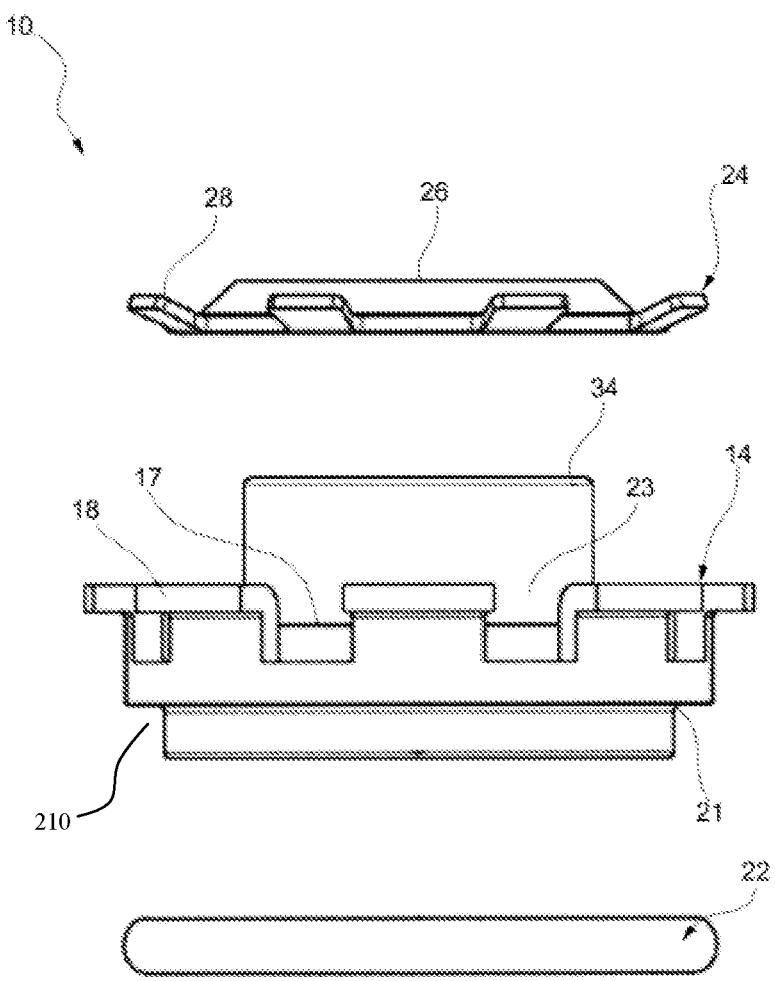
FIG. 3 is an exploded side view of the closure system in FIG. 2.
Figure 4:
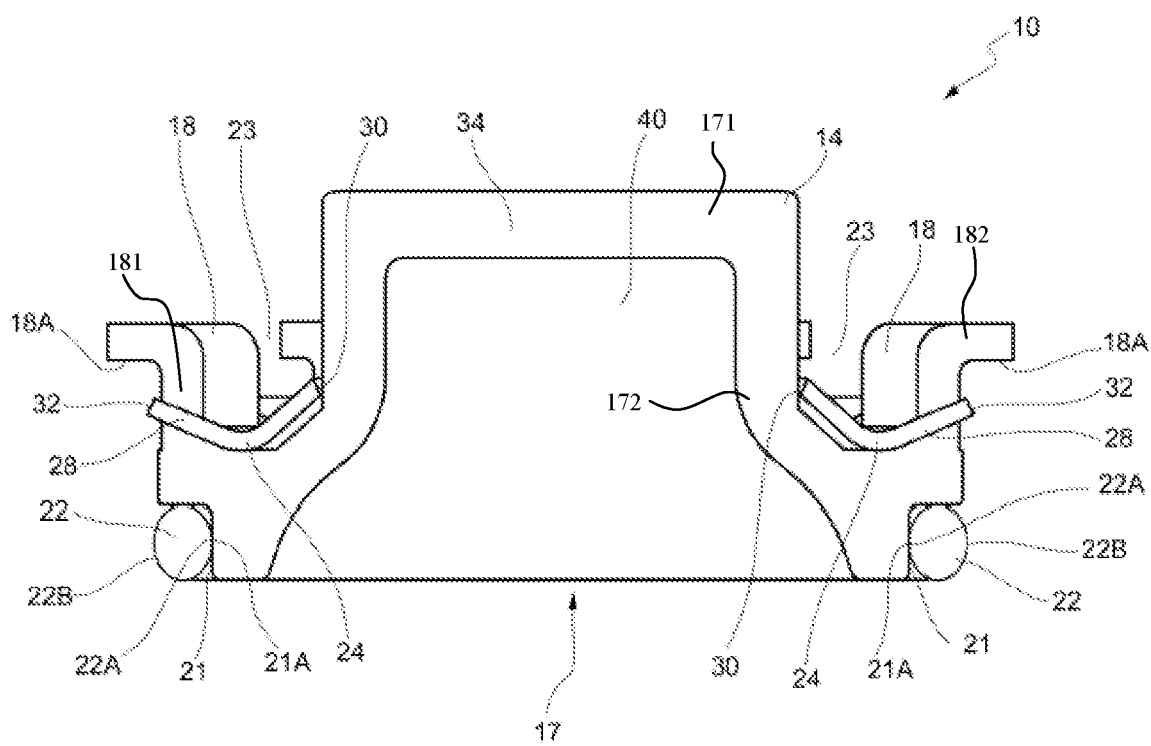
FIG. 4 is a sectional view of the closure system of FIG. 2.
Figure 5:
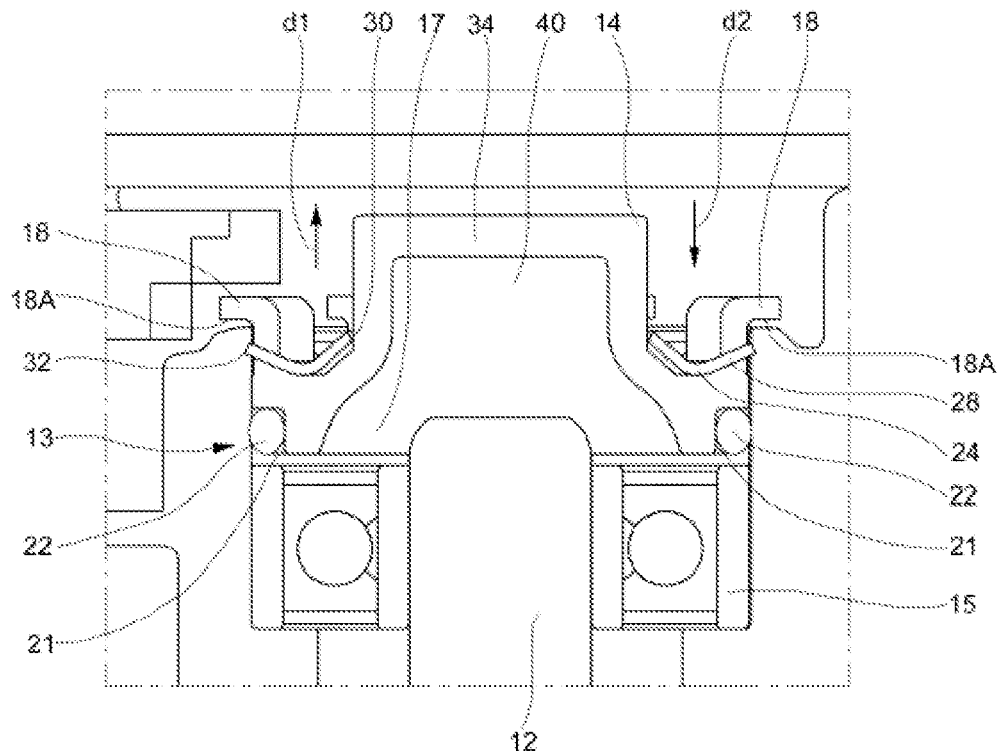
FIG. 5 is a sectional view of the closure system of FIG. 2, which is inserted in a seat for a rotor of an electric motor.

Referring initially to FIGS. 1 through 5, an exemplary embodiment of a closure system 10 for a seat 13 of an electric motor M adapted to house a rotor 12 of the electric motor M according to the disclosure is illustrated. The rotor 12 comprises a rotating shaft supported by two bearings 15 installed in a through hole in a central portion of the seat 13. The closure system 10 is located at the through hole of the seat 13 for protecting the rotating shaft.

The closure system 10 includes a lid 14 arranged to be at least partially inserted in the seat 13.

The lid 14 comprises a central portion 17 and a plurality of tabs 18 radially protruding from the central portion 17.

The tabs 18 of the lid 14 include an abutment surface 18A adapted to limit the insertion of the lid 14 in the seat 13. Each tab 18 defines an arm 181 extending from the central portion 17 along a direction toward a bottom surface of the central portion 17, and a curved end 182 extending perpendicularly from the arm. A restricting space 140 is formed by the arm of the tabs 18 together with the central portion 17 of the lid 14.

Moreover, the tabs 18 of the lid 14 are arranged in such a way as to form a free area 23 between each other. In other words, each free area 23 is formed between two consecutive tabs 18 of the lid 14. Specifically, the free area 23 is formed between each two adjacent arms, which is communicated with the restricting space 140.

Moreover, the closure system 10 comprises an annular gasket 22 arranged in a housing 21 defined in the lid 14, to isolate the seat 13. As can be seen from the figures, the housing 21 can be formed along the perimeter of the lid 14. Specifically, the housing 21 extends from the central portion 17 of the lid 14 and protrudes away from the bottom of the central portion 17 to form an annular shell. The annular shell adjacent to the bearing 15. Since the tabs 18 of the lid 14 extends outwardly from the outer surface of the central portion 17, a step gap 210 is accordingly formed by the tab 18 cooperated with the housing 21. The annular gasket 22 is received in the step gap 210 of the lid 14.

The closure system 10 further comprises a retaining element 24 mounted on the lid 14.

This retaining element 24 comprises a main body 25 which includes an opening 26 which at least partially receives the central portion 17 of the lid 14, and a plurality of tabs 28 radially protruding from the main body 25 of the retaining element 24.

Again with reference to the figures, it can be observed that the tabs 28 of the retaining element 24 are each arranged in one of the free area 23. The main body 25 is received in the restricting space 210 of the lid 14.

When the lid 14 is at least partially inserted in the seat 13, a first end 30 of the main body 25 of the retaining element 24, which faces the opening 26, presses elastically against the central portion 20 of the lid 14, and a radially protruding second end 32 of the tabs 28 of the retaining element 24 presses elastically against the seat 13, to prevent removal of the lid 14 from the seat 13. In one embodiment, In one embodiment, the main body 25 is in shape of an annular plate which leans obliquely against the central portion 17 of the lid 14, and the plurality of tabs 28 extend radially and obliquely from the annular plate for improving elasticity. A extending direction of the radially protruding second end 32 is accordingly inclined to the main body 25. The radially protruding second end 32 abuts against the inner surface of the through hole of the seat 13 to prevent the lid 14 from moving in the radial and axial directions. The curved end 182 of the tab 18 is attached to an edge of the through hole of the seat 13. The abutment surface 18A is connected to the edge of the through hole of the seat 13.

Moreover, when the lid 14 is at least partially inserted in the seat 13, the annular gasket 22 is arranged in contact between the lid 14 and the seat 13.

For example, as shown in the figures, a radially inner surface 22A of the annular gasket 22 contacts a wall 21A of the housing 21 and a radially outer surface 22B of the annular gasket 22 contacts a wall of the seat 13. The annular gasket 22 is received in the step gap 210 for sealing.

In the embodiment, the annular gasket 22 can end up being slightly compressed between the seat 13 and the wall 21A of the housing 21. Therefore, the annular gasket 22 can be maintained in the housing 21 and ensure that water or other materials do not penetrate between the seat 13 and the lid 14, i.e. insulate the seat 13.

Preferably, the diameter of the retaining element 24 is slightly wider than the inner diameter of the seat 13. In the embodiment, an elastic force generated by the tabs 28 of the retaining element 24 which is imparted against the seat 13 is higher, therefore ensuring a better fit of the lid 14 and the retaining element 24 in the seat 13. In order to achieve this effect, the radially protruding second end 32 of the tabs 28 protrudes slightly from the free area 23 in a radial direction and abuts against the inner surface of the through hole of the seat 13.

The tabs 28 of the retaining element 24 can have an elasticity such as to avoid their breakage when inserted in the seat 13.

The central portion 17 of the lid 14 may have a projection 34 which protrudes from the central portion 17 towards a direction d1, opposite to an insertion direction d2 of the lid 14 in the seat 13. The projection 34 can be used as a gripping point during the assembly of the lid 14 in the seat 13. This is particularly useful when automatic machines are used for the mass production of electric motors. In the embodiment, the direction d1 and the insertion direction d2 are substantially parallel to the rotating shaft, and the radial direction is perpendicular to the rotating shaft.

The lid 14 can be directly produced by moulding a plastic material. Thus, the resistance of the lid 14 is extremely high.

The central portion 17 of the lid 14 can also be hollow, so as to from an inner cavity 40 inside the lid 14. The rotating shaft is at least partially received in the inner cavity 40. The central portion 17 may be in the shape of a bowl and comprises a bottom 171 and a sidewall 172 extending perpendicularly from the bottom 171. The arm 181 of the tabs 18 extends outwardly from the sidewall 172 of the central portion 17 and toward the bottom 171. The housing 21 extends from the sidewall 172 of the central portion 17 and is adjacent to the bearing 15.

The retaining element 24 can instead be made of a metallic material.

The annular gasket 22, as shown in the figures, may be an O-ring.

Lastly, the plurality of tabs 18 of the lid 14 may be integrated with the central portion 17 of the lid 14.

The present disclosure also relates to a closing method of a seat 13 of an electric motor M adapted to house a rotor 12 of the electric motor M.

This method includes the step of housing an annular gasket 22 in a housing 21 defined in a lid 14 which further comprises a central portion 17 and a plurality of tabs 18 radially protruding from the central portion 17, forming a free area 23 with each other.

The method further comprises the step of at least partially inserting the central portion 17 of the lid 14 into an opening 26 of a main body 25 of a retaining element 24 which includes a plurality of tabs 28 radially protruding from the main body 25 of the retaining element 24.

The insertion of the lid 14 in the retaining element 24 being made in such a way so as to arrange the tabs 28 of the retaining element 24 in the free area 23 of the lid 14.

Furthermore, the method comprises the step of inserting the lid 14, which is inserted at least partially into the retaining element 24 and which houses the annular gasket 22, in the seat 13. The insertion of the lid 14 in the seat 13 being carried out in a manner that the annular gasket 22 is arranged in contact between the lid 14 and the seat 13, a first end 30 of the main body 25 of the retaining element 24 presses elastically against the central portion 17 of the lid 14, and a second end 32 of the tabs 28 of the radially protruding retaining element 24 presses elastically against the seat 13, so as to prevent removal of the lid 14 from the seat 13.

The advantage thus obtained is that of having provided a closure system for a seat of an electric motor adapted for housing a rotor of the electric motor, and a corresponding closing method which allows to guarantee a perfect and resistant sealing of the seat, without the need to apply a resin near the lid, which could compromise the operation of the engine.

Moreover, the present disclosure allows to speed up the production of such motors, since it does not require the step of applying resin to the lid in the seat for the rotor.

While the present disclosure has been described with reference to a specific embodiment, the description of the disclosure is illustrative and is not to be construed as limiting the disclosure. Various of modifications to the present disclosure can be made to the exemplary embodiment by those skilled in the art without departing from the true spirit and scope of the disclosure as defined by the appended claims.

The invention claimed is:

1. A closure system for a seat of an electric motor adapted to house a rotor of the electric motor, comprising:
a lid arranged to be at least partially inserted into the seat and comprising a central portion, a plurality of tabs radially protruding from the central portion and having a shoulder surface adapted to limit the insertion of the lid in the seat; the tabs of the lid being arranged so as to form a free area therebetween;
an annular gasket disposed in a housing defined in the lid, arranged to isolate the seat;
a retaining element, comprising a main body which comprises an opening that at least partially receives the central portion of the lid, and a plurality of tabs radially protruding from the main body of the retaining element; each tab of the retaining element being disposed in one of the free areas;
wherein, when the lid is at least partially inserted into the seat, the annular gasket is disposed in contact between the lid and the seat, one end of the main body of the retaining element, which faces the opening, elastically presses against the central portion of the lid, and an opposite radially protruding end of the tabs of the retaining element, elastically presses against the seat, to prevent the removal of the lid from the seat.

2. The closure system as described in claim 1, wherein the central portion of the lid has a protrusion protruding from the main body towards a direction opposite to an insertion direction of the lid in the seat; the protrusion being adapted to be used as a gripping point during the assembly of the lid in the seat.

3. The closure system as described in claim 1, wherein the retaining element is made of metallic material.

4. The closure system as described in claim 1, wherein the central portion of the lid is hollow, so as to form an inner cavity inside the lid.

5. The closure system as described in claim 1, wherein the annular gasket is an O-ring.

6. The closure system as described in claim 1, wherein the plurality of tabs of the lid is made in one piece with the central portion of the lid.

7. The closure system as described in claim 1, wherein the central portion of the lid comprises a bottom and a sidewall extending from the bottom, the tabs of the lid extend outwardly form the sidewall and toward the bottom, and the housing extends from the sidewall and protrudes away from the bottom.

8. The closure system as described in claim 1, wherein each tab of the lid comprises an arm extending from the central portion along a direction toward a bottom surface of the central portion, a curved end extending from the arm, and the free area is formed between each two adjacent arms.

9. The closure system as described in claim 1, wherein the main body of the retaining element is in shape of an annular plate, and the plurality of tabs extends radially and obliquely from the annular plate.

10. A closure system for a seat of an electric motor adapted to house a rotor of the electric motor, comprising:
a lid configured for being at least partially inserted into the seat, an annular gasket arranged on the lid for isolating the seat, and a retaining element; and wherein
the lid comprises a central portion, a plurality of tabs radially protruding from the central portion to limit the insertion of the lid in the seat, and a free area formed between each two adjacent tabs;
the retaining element comprises a main body having an opening which at least partially receives the central portion of the lid, and a plurality of tabs radially protruding from the main body of the retaining element; the retaining element is elastically pressed against the central portion of the lid, and an opposite radially protruding end of the retaining element is arranged in the free area to elastically abut against the seat to prevent the lid from being removed from the seat.

11. The closure system as described in claim 10, wherein the central portion of the lid has a protrusion protruding from the main body towards a direction opposite to an insertion direction of the lid in the seat, the protrusion being adapted to be used as a gripping point during the assembly of the lid in the seat.

12. The closure system as described in claim 10, wherein the central portion of the lid is hollow, so as to form an air chamber inside the lid.

13. The closure system as described in claim 10, wherein the central portion of the lid comprises a bottom and a sidewall extending from the bottom, the tabs of the lid extend outwardly form the sidewall and toward the bottom, a housing extends from the sidewall and protrudes away from the bottom to match the annular gasket.

14. The closure system as described in claim 13, wherein a step gap is formed by the tab of the lid cooperated with the housing, and the annular gasket is disposed in the step gap.

15. The closure system as described in claim 10, wherein each tab of the lid comprises an arm extending from the central portion along a direction toward a bottom surface of the central portion, a curved end extending from the arm and having a shoulder surface adapted to limit the insertion of the lid in the seat.

16. The closure system as described in claim 10, wherein the main body of the retaining element is in shape of an annular plate, and the plurality of tabs extends radially and obliquely from the annular plate.

17. An electric motor with closure system comprises:
a seat adapted to receive a rotor;
a closure system is at least partially adapted to the seat; and wherein the closure system comprises a lid arranged to be at least partially inserted into the seat, an annular gasket arranged in the lid for isolating the seat, and a retaining element;

the lid comprises a central portion, a plurality of tabs radially protruding from the central portion to limit the insertion of the lid in the seat, and a free area formed between each two adjacent tabs;

the retaining element comprises a main body having an opening which at least partially receives the lid, and a plurality of tabs radially protruding from the main body of the retaining element; the retaining element is elastically pressed against the central portion of the lid, and an opposite radially protruding end of the retaining element is arranged in the free area to elastically abut against the seat to prevent the lid from being removed from the seat.

18. The electric motor with closure system as described in claim 17, wherein the central portion of the lid has a protrusion protruding from the main body towards a direction opposite to an insertion direction of the lid in the seat, the opening of the retaining element at least partially receives the protrusion, and a extending direction of the plurality of tabs radially protruding from the main body is inclined to the main body.

19. A closure method of a seat of an electric motor adapted to house a rotor of the electric motor, comprising the steps of:

disposing an annular gasket on a housing defined in a lid comprising a central portion and a plurality of tabs radially protruding from the central portion, which from a free area therebetween;

inserting at least a protrusion of a portion of the central portion of the lid into an opening of a main body of a retaining element which includes a plurality of tabs radially protruding from the main body of the retaining element; the insertion being made so as to dispose each tab of the retaining element in the free area of the lid;

inserting the lid into the seat, the lid being disposed at least partially in the retaining element and receiving the annular gasket, so that the annular gasket is disposed in contact between the lid and the seat for sealing, a first end of the main body of the retaining element presses elastically against the central portion of the lid, and a second radially protruding end of the tabs of the retaining element elastically abuts against the seat, so as to prevent an extraction of the lid from the seat.

* * * * *